United States Patent
Ferlitsch (10) Patent No.: US 7,330,281 B2
(45) Date of Patent: Feb. 12, 2008

(54) SYSTEMS AND METHODS FOR PROVIDING IMAGING JOB CONTROL

(75) Inventor: Andrew Rodney Ferlitsch, Tigard, OR (US)

(73) Assignee: Sharp Laboratories of America, Inc., Camus, WA (US)

( * ) Notice: Subject to any disclaimer, the term of this patent is extended or adjusted under 35 U.S.C. 154(b) by 973 days.

(21) Appl. No.: 10/647,567

(22) Filed: Aug. 25, 2003

(65) Prior Publication Data
US 2005/0052664 A1 Mar. 10, 2005

(51) Int. Cl.
*G06F 15/00* (2006.01)
(52) U.S. Cl. .................. 358/1.13; 358/1.15; 358/1.18
(58) Field of Classification Search ............... 358/1.13, 358/1.15, 1.18
See application file for complete search history.

(56) References Cited

U.S. PATENT DOCUMENTS

| | | | |
|---|---|---|---|
| 5,781,711 A * | 7/1998 | Austin et al. ............... | 358/1.15 |
| 6,246,487 B1 | 6/2001 | Kobayashi et al. ......... | 358/1.13 |
| 6,480,916 B1 * | 11/2002 | Shishizuka et al. ......... | 710/107 |
| 6,697,898 B1 * | 2/2004 | Shishizuka et al. ......... | 710/107 |
| 6,708,217 B1 * | 3/2004 | Colson et al. .............. | 709/231 |
| 2001/0023461 A1 * | 9/2001 | Hara et al. .................. | 709/321 |
| 2002/0012453 A1 | 1/2002 | Hashimoto et al. ......... | 382/112 |
| 2002/0131065 A1 | 9/2002 | Sweetland et al. ......... | 358/1.13 |

* cited by examiner

*Primary Examiner*—Twyler Lamb Haskins
*Assistant Examiner*—Mark R. Milia
(74) *Attorney, Agent, or Firm*—Michael F. Krieger; Kirton & McConkie (57) ABSTRACT

Systems and methods for describing imaging tasks across a distributed environment of imaging clients, servers and devices, wherein the tasks include complex imaging operations, and interchanging imaging data and operations. The imaging jobs include diverse imaging tasks that can be constructed in a single program unit. The imaging tasks are constructed using a single imaging job language and common interface across all imaging devices, clients and servers, or managers thereof. A manager communicates with the imaging components through the common interface and translates the operations into the communication methods that are compatible with the devices, clients and servers. Composite imaging jobs are selectively dispatched to diverse imaging components through a single imaging spooler subsystem. Further, distribution may occur across various imaging devices, clients and/or servers, such that a first imaging system performs some subset of steps, deletes the executed steps and makes the appropriate substitutions or interchanges and the portion is performed by a second and/or subsequent imaging system.

19 Claims, 9 Drawing Sheets

Imaging Menu – Scan

Device: \\server\scanner1

Out File: C:\temp\scan.tif

Scan Options

[] Option 1
  ....
  [] Option N

---

Imaging Menu – Compose

Out File: C:\Temp\mynewdoc.xxx

| File 1: | mydoc.txt | Pages: | 1-3 |
| File 2: | *scan | Pages: | * |
| File 3: | mydoc.txt | Pages: | 4- |

---

Imaging Menu – Print

Device: \\server\printer1

In File: *compose

Print Options

[] Option 1
  ....
  [] Option N

SYSTEMS AND METHODS FOR PROVIDING IMAGING JOB CONTROL

BACKGROUND OF THE INVENTION

1. Field of the Invention

The present invention relates to providing imaging job control. In particular, the present invention relates to systems and methods for describing imaging tasks (e.g., print jobs, fax jobs, scan jobs and document management) across a distributed environment of imaging clients, servers and devices, wherein the tasks include complex imaging operations. The present invention further relates to interchanging imaging data and operations.

2. Background and Related Art

The control, distribution and interchange of a network print job include a system of communicating components that utilize a standardized communication and control system. An example of such a system is available in the Microsoft Windows® family of operating systems, which includes a print generation method for submitting documents/images as a print job, a print subsystem for controlling and despooling a print job to a printing device, a print job control language for controlling the rendering, paper processing and finishing on the printing device, and firmware in the printing device that works in conjunction with the print subsystem's despooling mechanism and print job control language to perform the print job.

Generally, the user initiates a print job through a document/image specific application and printer driver. The application/printer driver converts the document/image data into a printer ready format (e.g., PCL). The printer driver may also display a print menu from which the user may select one or more print options that control how the printer renders (e.g., resolution), assembles (e.g., duplex) and finishes (e.g., stapling) the print job. The selected print options are then converted into print job control commands (e.g., PJL). The printer driver then combines the print job control commands with the printer ready data into a print job and submits the print job to the print spooler. The print spooler despools the print job through the despooling print subsystem (e.g., print processor and port manager) to the targeted printer.

An alternative technique, which is referred to as "direct printing," includes a document/image format (e.g., PDF, TIFF) that is supported by the printing device as printer ready data. In this technique, the user selects print options from a direct submit application. The selected print options are then converted into print job control commands. The direct submit application then combines the print job control commands with the printer ready data into a print job and submits the print job to the print spooler.

While this technique supports a method of programming the control of the printing task, it does not provide programming methods for more complex operations surrounding the print job, such as (i) building a composite print job; (ii) faxing one or more electronic copies of the print job; (iii) retrieving the document/images from an archive/retrieval document system; or (iv) specifying imaging operations to be performed on the print server.

In another technique, the print and fax imaging tasks are merged into the same print/fax subsystem, such as in Microsoft Windows® XP. This technique is similar to the print spooler technique described above, except that a fax driver is used in place of a printer driver. The fax driver converts the document/image into a fax ready data, generates fax control commands compatible with fax machine, combines the fax control commands and fax ready data into a fax job, and spools the fax job to the combined print/fax spooler. The print/fax spooler despools the fax job through the despooling print/fax subsystem to the targeted fax machine.

While this technique allows using the same imaging subsystems for both print and fax, it still suffers in that it cannot combine a print and fax job into a single composite job (i.e., print and fax jobs are separate), and includes other limitations mentioned above.

In another technique, a document management appliance combines document archive/retrieval with imaging device management. In this technique, multiple imaging clients (e.g., personal computers) and multi-functional peripheral devices can be connected to the management device. While this technique includes the advantages that imaging tasks are built from a common interface and that composite imaging jobs (e.g., print and scan) can be constructed, the technique suffers in that it requires the addition of a hardware device (i.e., appliance), restricts imaging jobs to document/images stored on the appliance, and restricts composite imaging jobs to only those supported by the particular manufacturer's imaging devices.

Thus, while imaging techniques currently exist, the imaging techniques include a variety of challenges. For example, available imaging technology currently includes imaging program languages that are specialized for specific imaging operations. Thus, a print job control language is typically used to describe the job control of a print job and can be interchanged between an imaging client and device. However, since the print job control language is only used to control print operations, complex jobs that include a composite of other imaging operations (e.g., a scan job, a fax job and an archive/retrieval job) cannot be described. Further, the initiation of distributed imaging operations and interchange is performed manually. Accordingly, it would be an improvement in the art to augment or even replace current techniques with other techniques.

SUMMARY OF THE INVENTION

The present invention relates to providing imaging job control. In particular, the present invention relates to systems and methods for describing imaging tasks (e.g., print jobs, fax jobs, scan jobs and document management) across a distributed environment of imaging clients, servers and devices, wherein the tasks include complex imaging operations. The present invention further relates to interchanging imaging data and operations.

Implementation of the present invention takes place in association with an imaging environment. For example, the imaging environment is configured to be able to process an imaging job that includes diverse imaging tasks that are distributed across multiple imaging devices, and/or clients and servers. The individual operations are programmable and can be selectively distributed across imaging devices, clients and servers.

Implementation of the present invention embraces providing composite imaging jobs that include diverse imaging tasks that can be constructed in a single program unit. The imaging tasks are constructed using a single imaging job language (IJL) and common interface across all imaging devices, clients and servers, or managers thereof. In at least one implementation, a manager communicates with the imaging components through the common interface and translates the operations into the communication methods (e.g., LPR, SNMP, Bmlinks, XML, HTTP, etc.) that are compatible with the devices, clients and servers.

Composite imaging jobs are selectively dispatched to diverse imaging components through a single imaging spooler subsystem. Further, distribution may occur across various imaging devices, clients and/or servers, such that a first imaging system performs some subset of steps, deletes the executed steps and makes the appropriate substitutions or interchanges and the remaining portion is performed by a second and/or subsequent imaging system.

The methods and processes of the present invention have proven to be particularly useful in the area of processing complex imaging jobs. Those skilled in the art will appreciate that the methods and processes can be used in a variety of different applications for the rendering of a variety of different kinds of imaging, including printing, scanning, faxing, and the like.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to providing imaging job control. In particular, the present invention relates to systems and methods for describing imaging tasks (e.g., print jobs, fax jobs, scan jobs and document management) across a distributed environment of imaging clients, servers and devices, wherein the tasks include complex imaging operations. The present invention further relates to interchanging imaging data and operations.

The following disclosure of the present invention is grouped into two subheadings, namely "Exemplary Operating Environment" and "Providing Imaging Job Control." The utilization of the subheadings is for convenience of the reader only and is not to be construed as limiting in any sense.

Embodiments of the present invention take place in association with an electronic imaging environment. For example, the imaging environment is configured to be able to process an imaging job that includes diverse imaging tasks that are distributed across multiple imaging devices, and/or clients and servers. The individual operations are programmable and can be selectively distributed across imaging devices, clients and servers.

At least some embodiments of the present invention embrace providing composite imaging jobs that include diverse imaging tasks that can be constructed in a single program unit. The imaging tasks are constructed using a single imaging job language (IJL) and common interface across all imaging devices, clients and servers, or managers thereof. In at least one implementation, a manager communicates with the imaging components through the common interface and translates the operations into the communication methods (e.g., LPR, SNMP, Bmlinks, XML, HTTP, etc.) that are compatible with the devices, clients and servers.

Composite imaging jobs are selectively dispatched to diverse imaging components through a single imaging spooler subsystem. Further, distribution may occur across various imaging devices, clients and/or servers, such that a first imaging system performs some subset of steps, deletes the executed steps and makes the appropriate substitutions or interchanges and the portion is performed by a second and/or subsequent imaging system.

Exemplary Operating Environment

Figure 1:
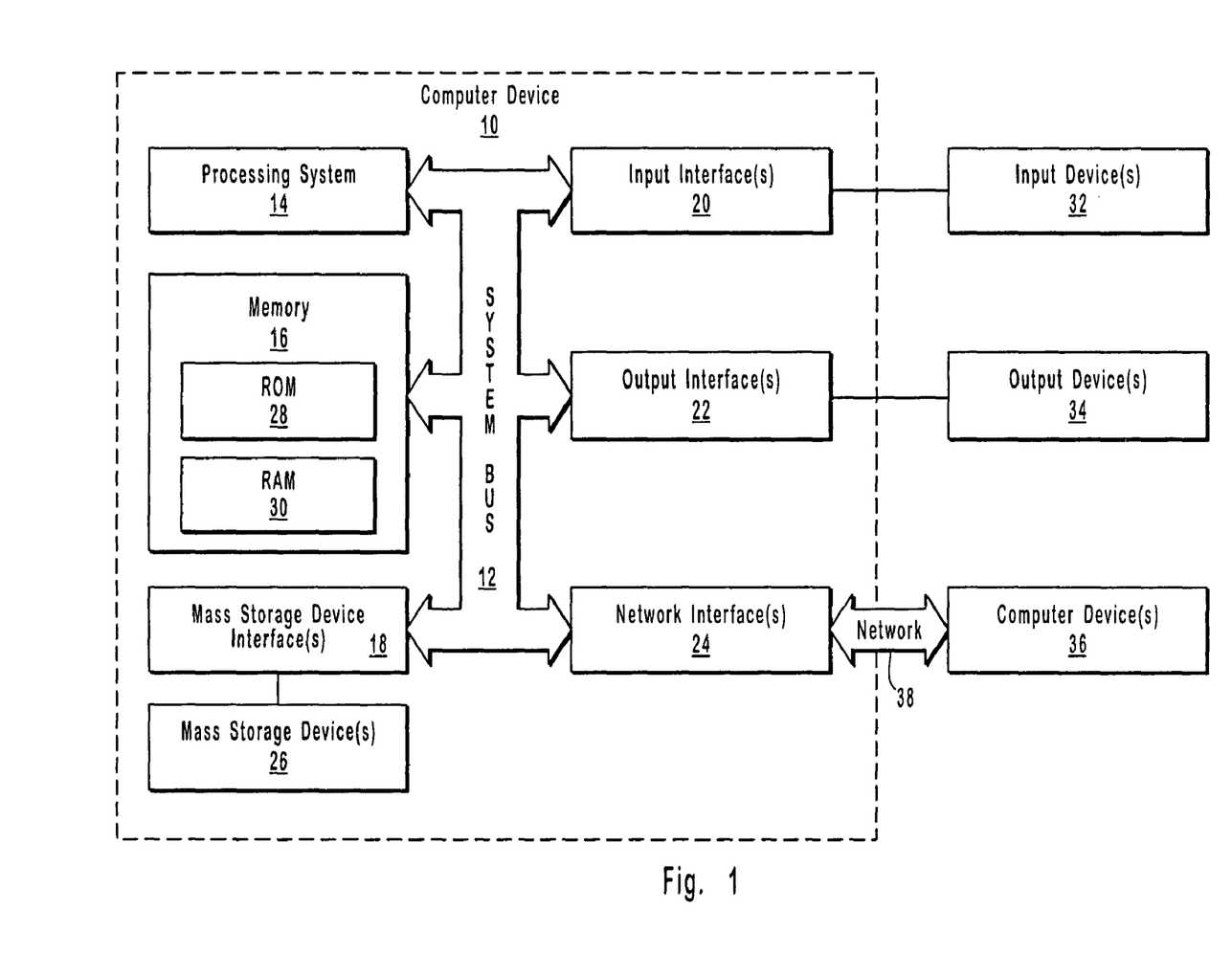
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Those skilled in the art will appreciate that embodiments of the present invention embrace a variety of different system configurations. For example, in accordance with at least some embodiments of the present invention, a system configuration or imaging environment includes computer based imaging system, such as printing, scanning, faxing and document archive/retrieval, that includes one or more client computing devices (imaging clients), optionally one or more server computing environments (imaging servers), and one or more multi-functional peripheral (MFP) devices or other imaging devices. Embodiments of the present invention further embrace a system with a common imaging job control language, a centralized imaging despooling subsystem, and a mechanism to distribute composite imaging tasks across diverse imaging devices, clients and/or servers, with interchanging imaging data.

Figure 2:
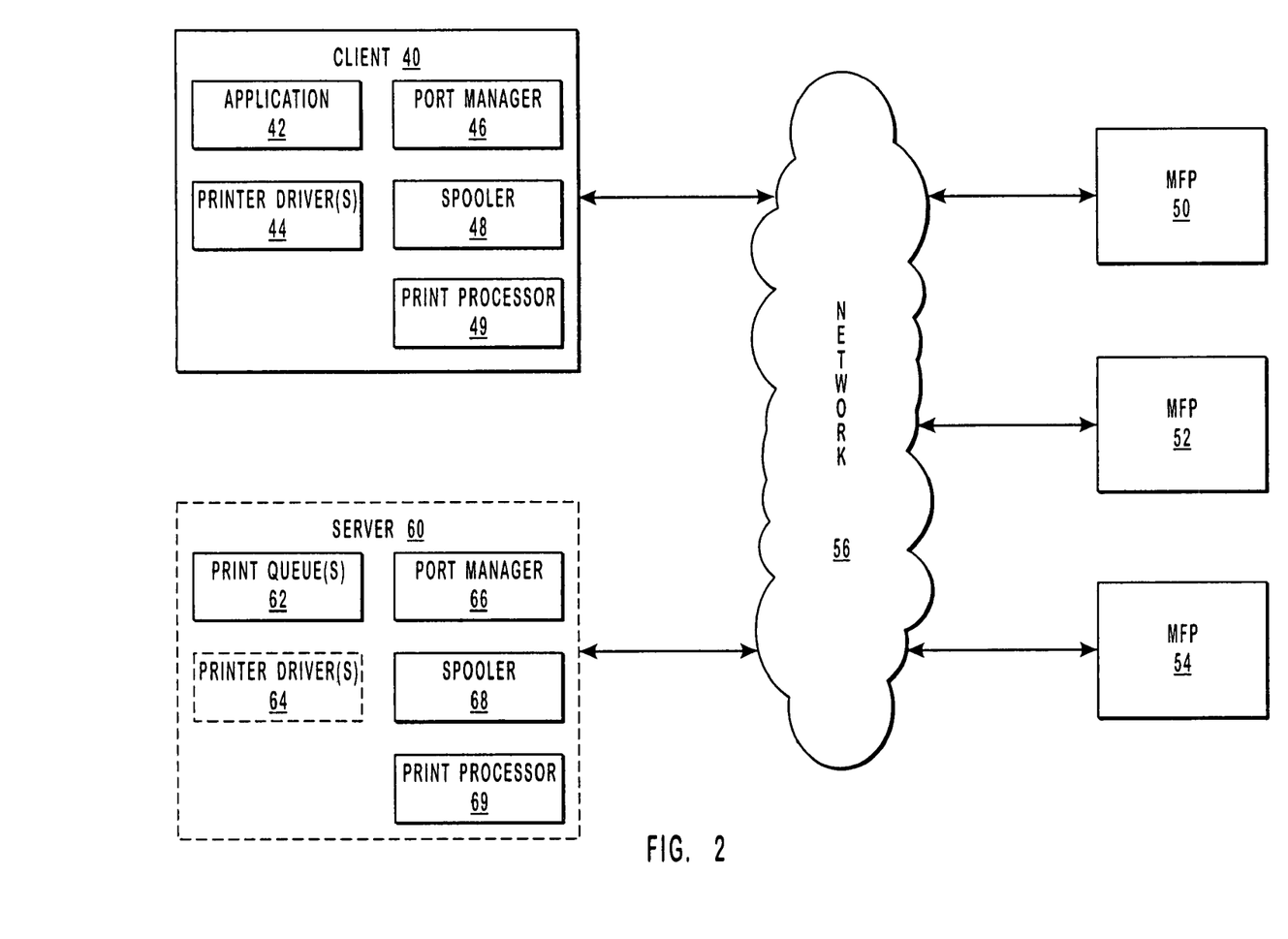
FIG. 2 a representative networked system configuration in accordance with an embodiment of the present invention.

Thus, while those skilled in the art will appreciate that embodiments of the present invention may be practiced in a variety of different environments with many types of computer system configurations, FIG. 2 provides a representative networked system configuration that may be used in association with the present invention. While FIG. 2 illustrates an embodiment that includes a client, three multi-functional peripheral (MFP) devices, and optionally a print server connected to a network, alternative embodiments include more than one client, less than three MFPs, more than three MFPs, no server, and/or more than one server connected to a network. Other embodiments of the present invention include local, networked, or peer-peer imaging environments where one or more computer devices are connected to one or more imaging devices. Moreover, embodiments in accordance with the present invention also include wireless networked environments, or where the network is a wide area network, such as the Internet.

The representative system of FIG. 2 includes a computer device, illustrated as client 40, which is connected to a plurality of peripheral devices or other imaging devices (illustrated as MFP 50, MFP 52, and MFP 54) across network 56. In FIG. 2, MFPs 50-54 may be any type of device that may be used to render an imaging job. In one embodiment, the capabilities of any one of the MFPs are heterogeneous to the capabilities of any other MFP (e.g., at least one of the capabilities of one printing device, such as MFP 50, are different from the capabilities of another MFP device, such as MFP 52). In another embodiment, the capabilities of the MFPs are homogeneous.

While MFPs 50-54 are connected to network 56, embodiments of the present invention embrace the use of peripheral imaging devices that are locally connected to a computer device, that are configured in a peer-to-peer printing environment, or that are configured in a wireless network environment.

In the illustrated embodiment, client 40 includes a software application 42, one or more print drivers 44, a port manager 46, a spooler 48, and a print processor 49. A printer server 60 is optionally included having, for example, one or more print queues 62, one or more printer drivers 64, a port manager 66, a spooler 68, and a print processor 69.

Thus, in accordance with the illustrated embodiment and other embodiments of the present invention, imaging job control is provided. In particular, embodiments of the present invention relate to systems and methods for describing imaging tasks (e.g., print jobs, fax jobs, scan jobs and document management) across a distributed environment of imaging clients, servers and devices, wherein the tasks include complex imaging operations. The present invention further relates to interchanging imaging data and operations.

Providing Imaging Job Control

An imaging task (e.g., print jobs, fax jobs, scan jobs and document management) may be generated in a number of manners. For example, an imaging job may be constructed using a document/image specific application and imaging driver, by using an imaging management application that is independent of the document/image format, from a direct submit application, or in another manner.

As provided above, embodiments of the present invention relate to systems and methods for describing imaging tasks across a distributed environment of imaging clients, servers and devices, wherein the tasks include complex imaging operations. Embodiments of the present invention further relate to interchanging imaging data and operations.

Figure 3:
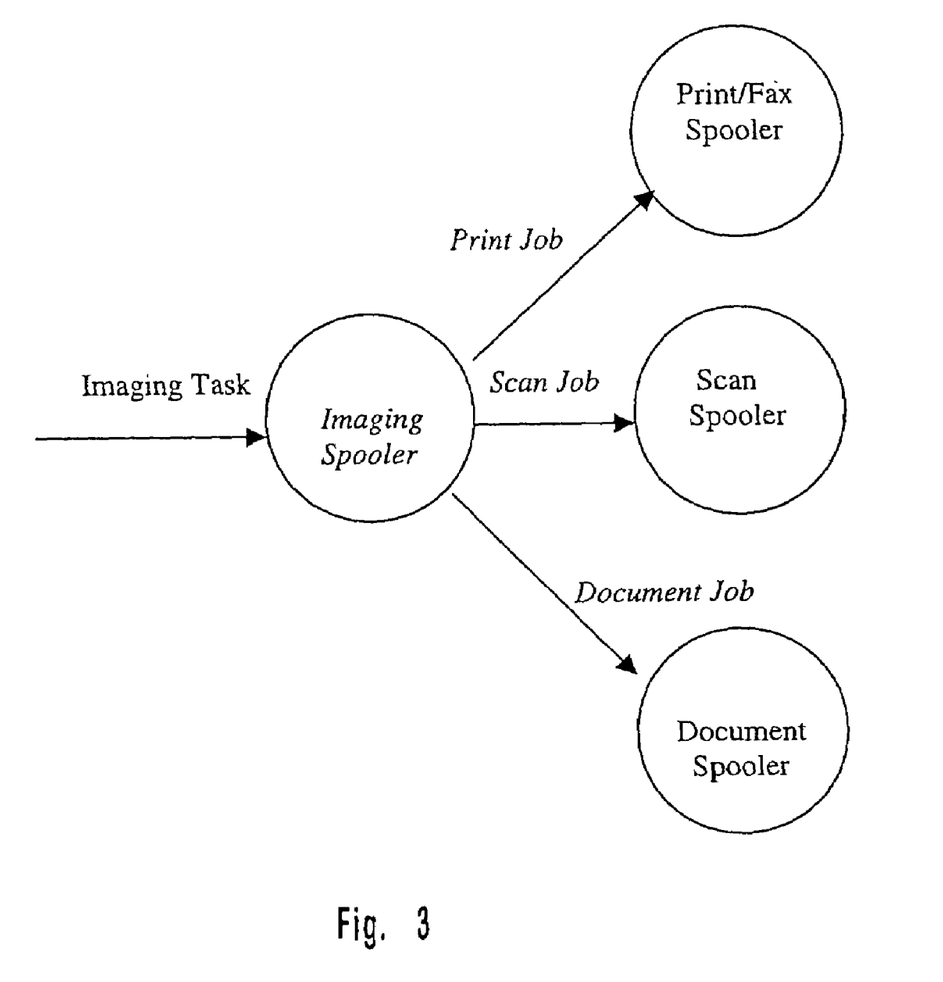
FIGS. 3 and 4 illustrate representative configurations, wherein an imaging spooler integrated with spooling subsystems.
Figure 4:
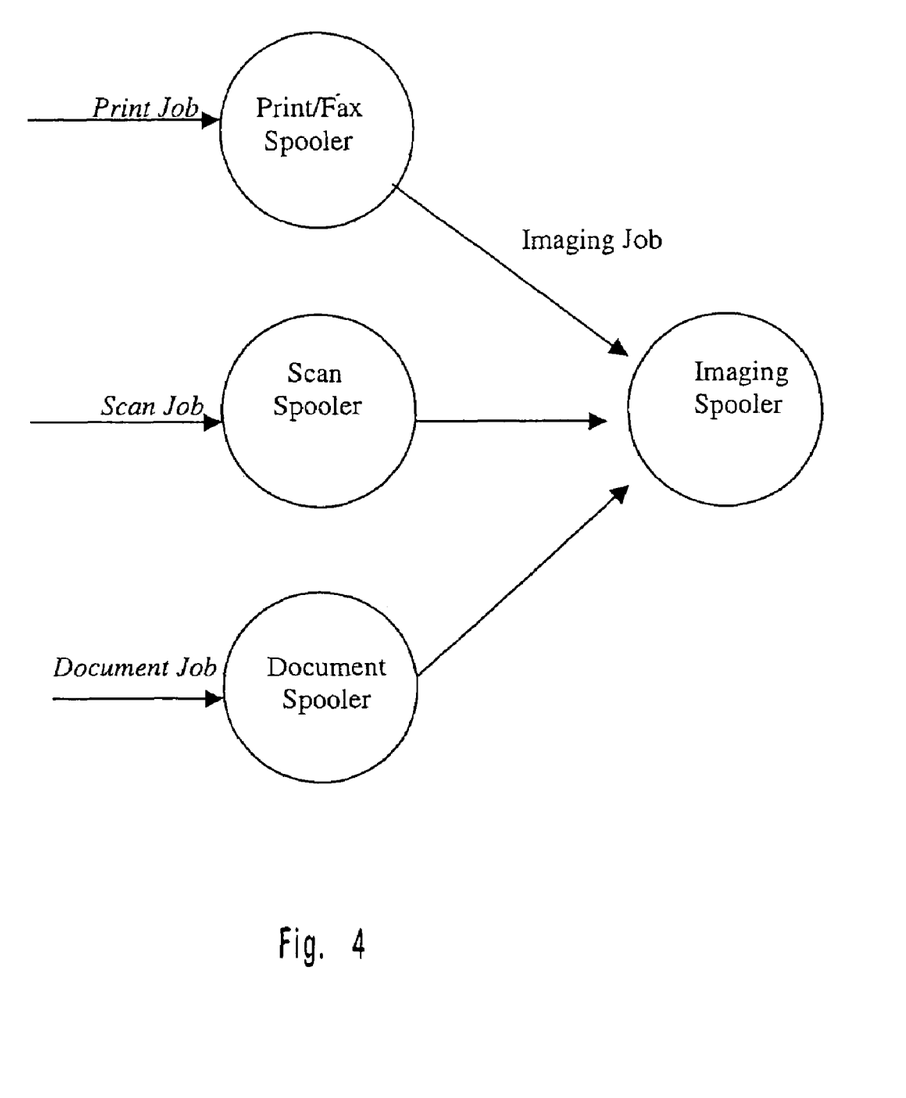

With reference now to FIGS. 3 and 4, representative spooler configurations are illustrated in accordance with embodiments of the present invention, wherein an imaging spooler integrated with spooling subsystems, such as a print, fax, scan and document spoolers. As illustrated in FIG. 3, imaging tasks or jobs may be spooled to the imaging spooler. After performing some action, the imaging spooler then spools an imaging task(s) or job(s) to one or more corresponding pre-existing system spooler (e.g., print spooler), which despools the imaging task to the corresponding logical device (e.g., installed printer). Alternatively, as illustrated in FIG. 4, imaging jobs may be spooled to the system spoolers (e.g., print spooler), and the system spooler then despools the imaging job to the imaging spooler, where the imaging spooler is configured (e.g., port manager) to appear as a logical device (e.g., installed printer).

In another configuration, imaging jobs may cycle multiple times through the imaging and system spoolers. For example, a print job may be spooled to the system's print spooler to be despooled to a logical printer, such as an installed printer in the Microsoft Windows® environment. In this case, the port manger for the installed printer is configured to respool the print job back to the imaging spooler. Upon completion of the respool to the imaging spooler, the imaging spooler may then perform some action (e.g., modifying the print job), and respool the print job back to the system's print spooler for despooling to a logical printer associated with a physical printer. The print spooler then despools the print job to the port manager associated with the logical printer, which then sends the print job to the physical printer.

In another embodiment, the imaging spooler does not integrate with existing spooler subsystems, but instead implements the equivalent operations within an imaging spooler without the assistance of any existing spooler component.

Figure 5:
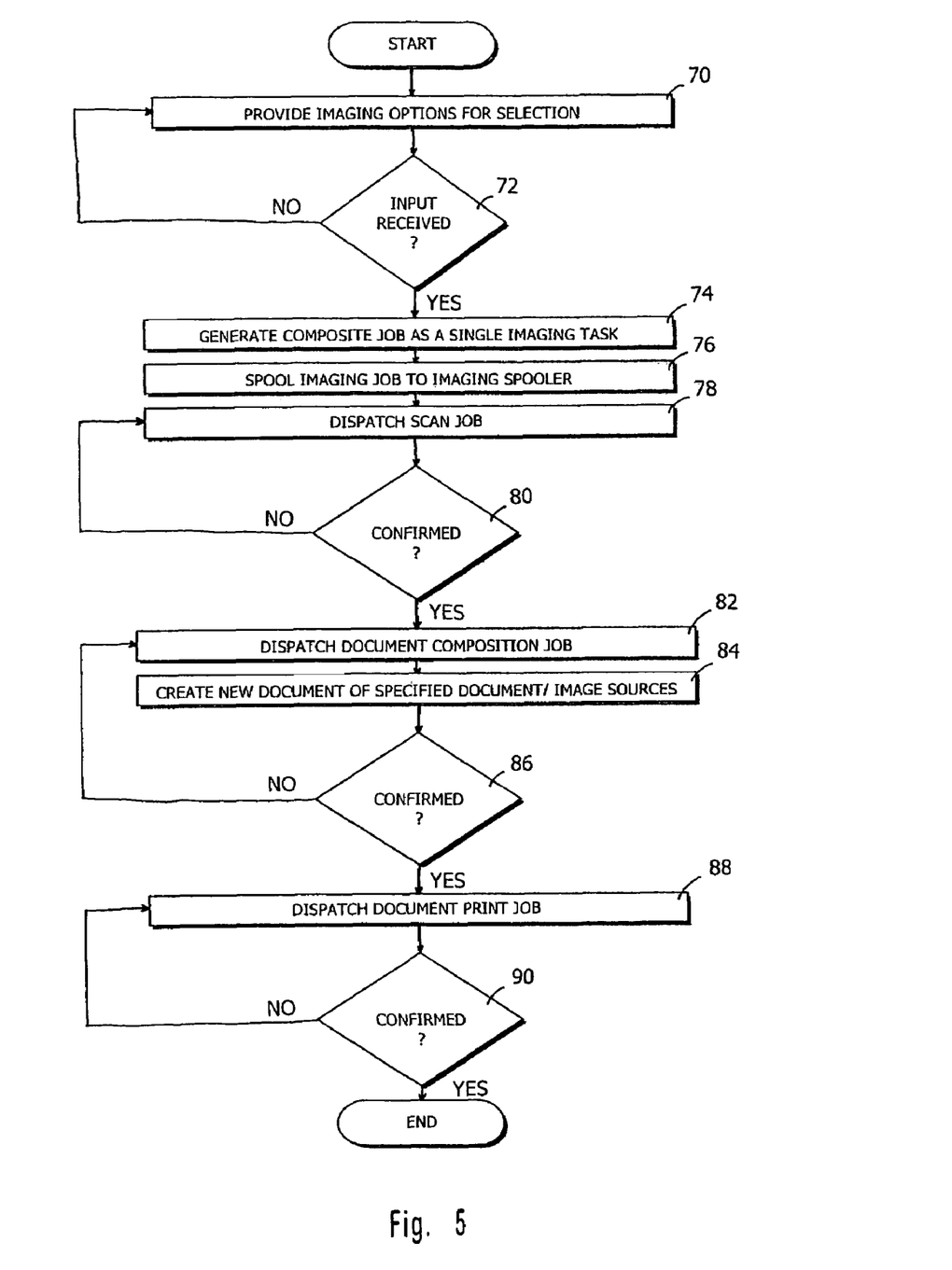
FIG. 5 illustrates representative processing for providing imaging job control.

With reference now to FIG. 5, in order to discuss aspects of embodiments of the present invention, the processing of a representative composite imaging job will be described. In FIG. 5, the imaging job includes the following imaging operations: (i) scanning a document from a scanner, (ii) composing a new document that includes the first three pages of an existing document, a scanned document, and the remaining pages of the existing document; and (iii) printing the composed document.

In the embodiment illustrated in FIG. 5, an imaging application exists for specifying the imaging tasks and spooling the imaging job to the imaging spooler. In this embodiment, the imaging application has menus for specifying the scanning operations, document composition operations and print operations. Accordingly, in FIG. 5 execution begins at step 70, which provides imaging options for selection.

Figure 6:
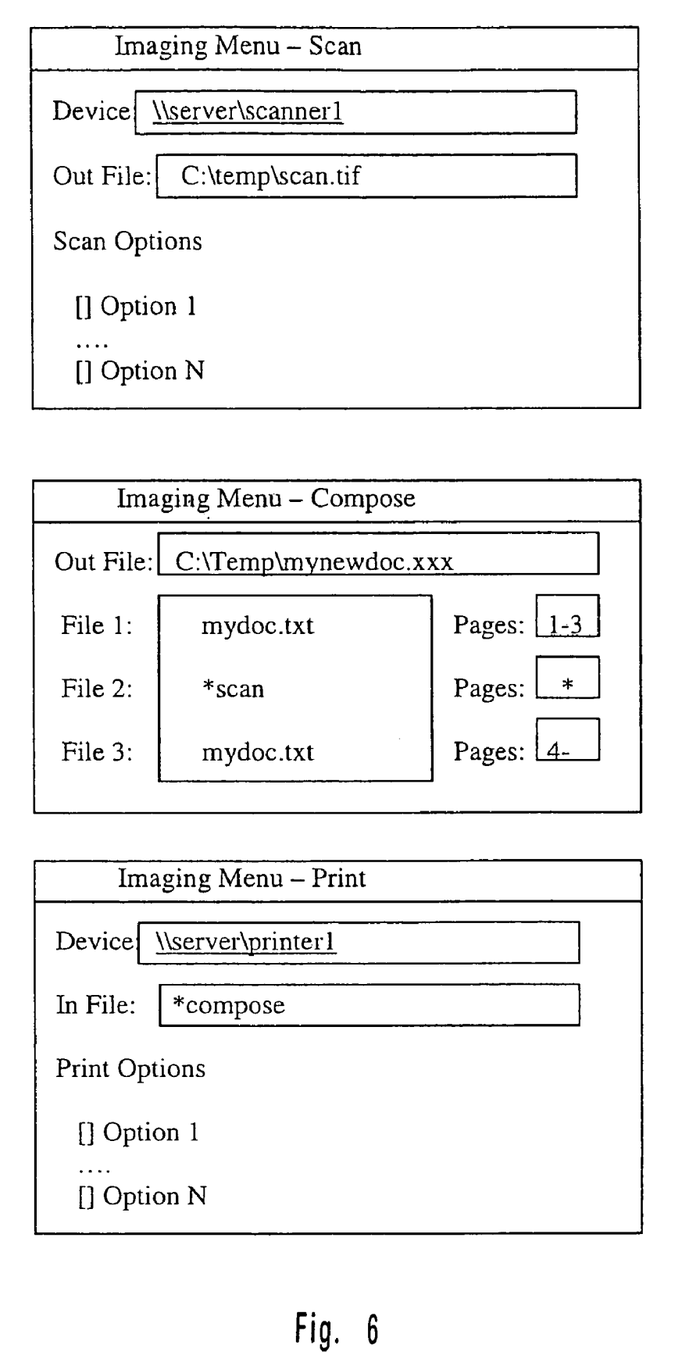
FIG. 6 illustrates representative menu selections available for imaging job construction.

With reference now to FIG. 6, representative menu selections available for imaging job construction are illustrated. For example, the user specifies in the scan menu (i) the device from which to scan the document, (ii) the output file for the scanned image data, and (iii) any scanning related options (e.g., resolution). In the document composition menu, the user specifies (i) the device to which to compose the document, (ii) composition of the new document (e.g., pages 1-3 of an existing document, scanned image data, and/or the remaining pages of the existing document), (iii) the output file for the new document, and (iv) composition related options. In the print menu, the user specifies (i) the device to which to print, (ii) the name of the document to print, and (iii) print related options (e.g., duplex).

FIG. 6 is a representative example of the menu selection in an imaging application. In FIG. 6, the user specifies the scan job by selecting a scanning device, \\server\printer1, and an output file name, C:\Temp\Scan.TIF, in the scan menu. The user then specifies the composition job by selecting the first document component as the first 3 pages of an existing file, mydoc.txt, followed by the scanned image data from the scan job, denoted by the *scan in FIG. 6, and ending in the remaining pages of the existing file, mydoc.txt. The user then specifies the print job by selecting the printing device, \\server\scanner1, and the composed document as the input file, denoted by the *compose in this example.

This composite job is then generated as a single imaging task using an imaging control language (IJL) to specify and control the imaging operations. For the above example, a representative IJL job includes the following:

```
@IJL SET JOB = "imaging job 1"           #Master Job
@IJL DO JOB "scan job 1"
@IJL JOB WAIT
@IJL DO JOB "compose job 1"
@IJL JOB WAIT
@IJL DO JOB "print job 1"
@IJL EOJ
@IJL SET JOB = "scan job 1"
@IJL SET DEVICE = \\server\scanner1      #Scan Job
@SJL SET DESTINATION = C:\Temp\Scan.TIF
@SJL SET <OPTION 1>
...
@SJL SET <OPTION N>
@IJL EOJ
@IJL SET JOB = "compose job 1"           #Composition Job
@IJL SET DEVICE = <PC>       # this PC
@DJL SET COMPOSITION = ON
@DJL ADD mydoc.txt:1-3
@DJL ADD C:\Temp\Scan.TIF
@DJL ADD mydoc.txt:4-
@IJL EOJ
@IJL SET JOB = "print job 1"
@IJL SET DEVICE = \\server\printer1
@PJL SET <OPTION 1>
...
@PJL SET <OPTION N>
@PJL SET INFILE = mynewdoc.xxx
@IJL EOJ
```

The above IJL job includes 4 sections, namely (i) the Master Job, (ii) the Scan Job, (iii) the Composition Job, and (iv) the Print Job. The master job component controls the dispatch of the individual imaging jobs (e.g., print, scan and compose). In this example, the master job identifies (@IJL SET JOB) the imaging job (i.e., job name), and then dispatches (@IJL DO JOB) the scan, compose and print jobs. Because the compose job is dependent on the completion of the scan job, and the print job is dependent on the completion of the compose job, the master job also instructs the dispatch of the compose job and the print job to wait for the completion of the previous job (@IJL JOB WAIT). Without the job wait command, the dispatcher would be free to dispatch the individual jobs asynchronously (e.g., parallel).

In this example, the scan job, denoted by @SJL (Scan Job Language), identifies the scan job (@IJL SET JOB), the logical scanner (e.g., in the Microsoft Windows® environment, the installed device associated with the physical scanner) to scan a document from (@IJL SET DEVICE), the pathname of the output file for the scanned image data (@SJL SET DESTINATION), and one or more scan related options.

In this example, the composition job, denoted by @DJL (Document Job Language), identifies the composition job (@IJL SET JOB), the logical host computing device (e.g., local PC) to store the composed document (@IJL SET DEVICE), and the construction of the composed document (@DJL SET COMPOSITION, @DJL ADD). In the case of the scanned image data, the imaging application replaced the reference to "*scan" in the compose menu to the output file (C:\Temp\Scan.TIF) specified in the scan menu.

In this example, the print job, denoted by @PJL (Print Job Language), identifies the print job (@IJL SET JOB), the logical printer (e.g., in the Microsoft Windows® environment, the installed device associated with the physical printer) to print the composed document to (@IJL SET DEVICE), the pathname of the composed document to print (@PJL SET INFILE), and one or more related print options. For the composed document, the imaging application related the reference to "compose" in the print menu to the output file (mynewdoc.txt) specified in the compose menu.

Accordingly, with reference back to FIG. 5, imaging options are provided for selection at step 70. A determination is then made at step 72 as to whether or not the imaging option input has been received. If it has not yet been received, execution returns back to step 70 until the input has been received. Once received, execution proceeds to step 74, where a composite job is generated as a single imaging task. At step 76, the imaging task or job is spooled to an imaging spooler, such as the imaging spooler illustrated in FIG. 3.

After the imaging job has been spooled to the imaging spooler, the imaging spooler then, either immediately or delayed, dispatches the individual imaging jobs. Accordingly, in the present example, the imaging spooler first dispatches the scan job (step 78 of FIG. 5) and waits for its completion, according to the master job description. The imaging spooler locates the scan job portion of the imaging job, using the job name identifier in the master job (e.g., @IJL DO JOB "scan job 1") and the job identifier in each individual imaging job (e.g., @IJL SET JOB="scan job 1").

The imaging spooler dispatches the scan job portion (@SJL) of the imaging job at step 78 to the scan spooler subsystem for despooling to the logical scanning device specified in the @IJL SET DEVICE command. The imaging spooler monitors the completion of the scan job. For example, the imaging spooler may invoke a scan job monitoring process that either (i) waits for a message or queries the scan spooler subsystem for confirmation of completion of the scanned job, or (ii) polls the location of the scanned image output file to detect its creation and completion.

Figure 7:
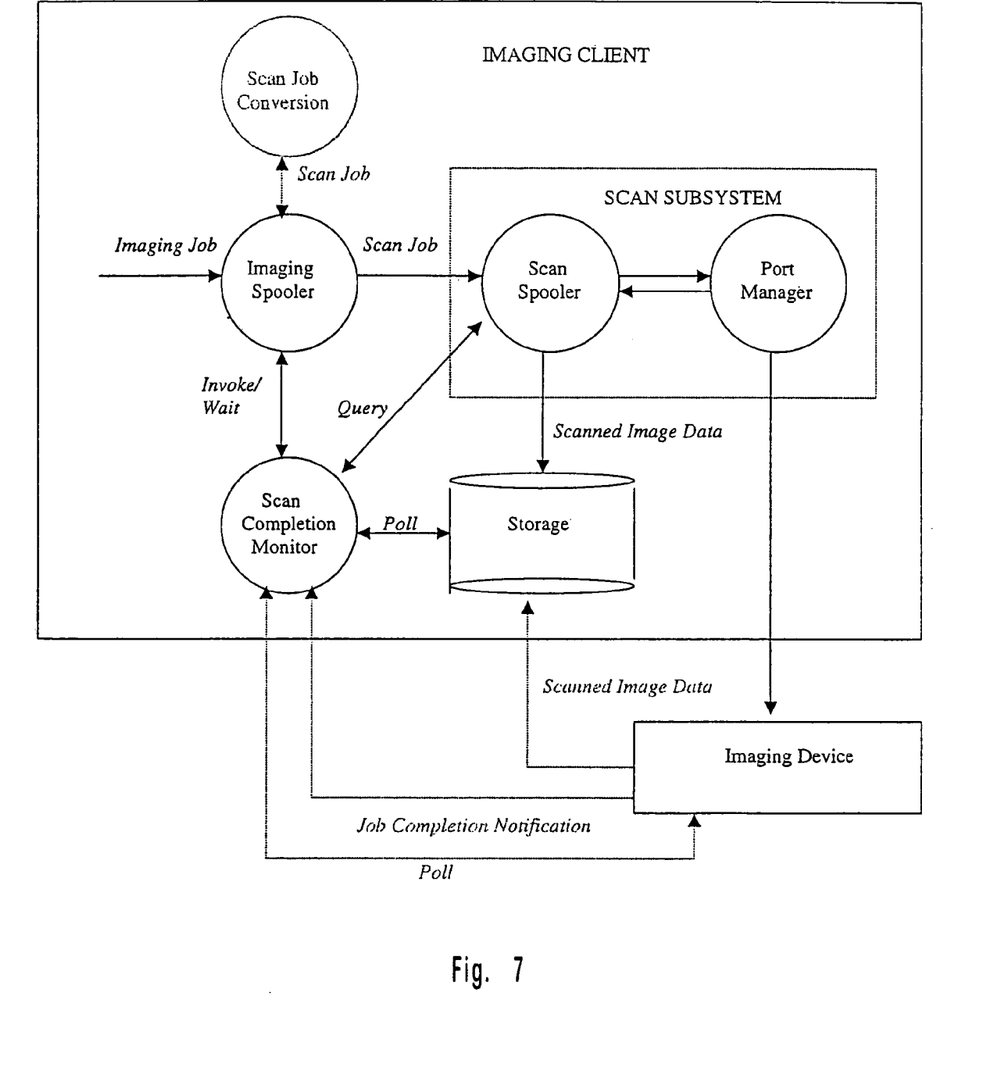
FIGS. 7-9 illustrate representative imaging job dispatch in accordance with embodiments of the present invention.

The imaging spooler may also control how and/or when the scan spooler despools the scan job by specifying scheduling and spooling settings for the scan job with the scan spooler. The scan spooler, after receiving the scan job, despools the scan job, either immediately or delayed, to the port manager associated with the logical scanner. The scan spooler or imaging spooler may also modify the scan job to be compatible with the scanning device. This is illustrated in FIG. 7.

Once the scan job is received by the scanning device, the scanning device either (i) (interactive) waits for user input at the device that the document is inserted and to initiate the scan, (ii) (automatic) senses that a document already is inserted into the document feeder and automatically initiates the scan, or (iii) (spooled) detects that the requested scanned image data was already scanned and retrieves the scanned image data from storage.

Upon completion, the scanning device then sends the scanned image data to the specified location. Once the scanned image data is successfully written to the destination, the scanning device either sends an acknowledgement of job completion to the scan spooler subsystem, a scan job monitor, or is detected by another asynchronous process, such as those described earlier. This is illustrated by decision block 80, which determines whether or not the desired processing is confirmed.

The imaging spooler may also perform other operations related to the scan job, such as, but not limited to: (i) scanner pooling—e.g., selecting an alternative compatible scanner based on some criteria, such as most available; (ii) error recovery—e.g., detecting job failure, notifying the user and/or rescheduling the scan job on the same device or restarting on another compatible device; or (iii) job accounting—e.g., authorizing the use of the device and recording the amount of consumables used (e.g., paper and toner).

As also illustrated in FIG. 7, the scanning device may send the scanned image data to the destination by means other than through the scan spooler subsystem on the imaging client (e.g., FTP), the scanning device may send job completion notification by means other than through the scan spooler subsystem (e.g., to a separate scan job monitoring process on the imaging client), and/or the imaging spooler may detect scan job completion by querying/polling the scanning device.

With reference back to FIG. 5, after detecting completion or confirmation of the scan job at decision block 80, the imaging spooler dispatches the document composition job at step 82 and waits for its completion, according the master job description. The imaging spooler locates the document composition job portion of the imaging job, using the job name identifier in the master job (e.g., @IJL DO JOB "compose job 1") and the job identifier in each individual imaging job (e.g., @IJL SET JOB="compose job 1").

The imaging spooler dispatches the document composition job portion (@DJL) of the imaging job to the document spooler subsystem for despooling to a document composition process. The imaging spooler monitors the completion of the document composition job. For example, the imaging spooler invokes a document job monitoring process that either (i) waits for a message or queries the document spooler subsystem for confirmation of completion of the document composition job, or (ii) polls the location of the composed document output file to detect is creation and completion.

Figure 8:
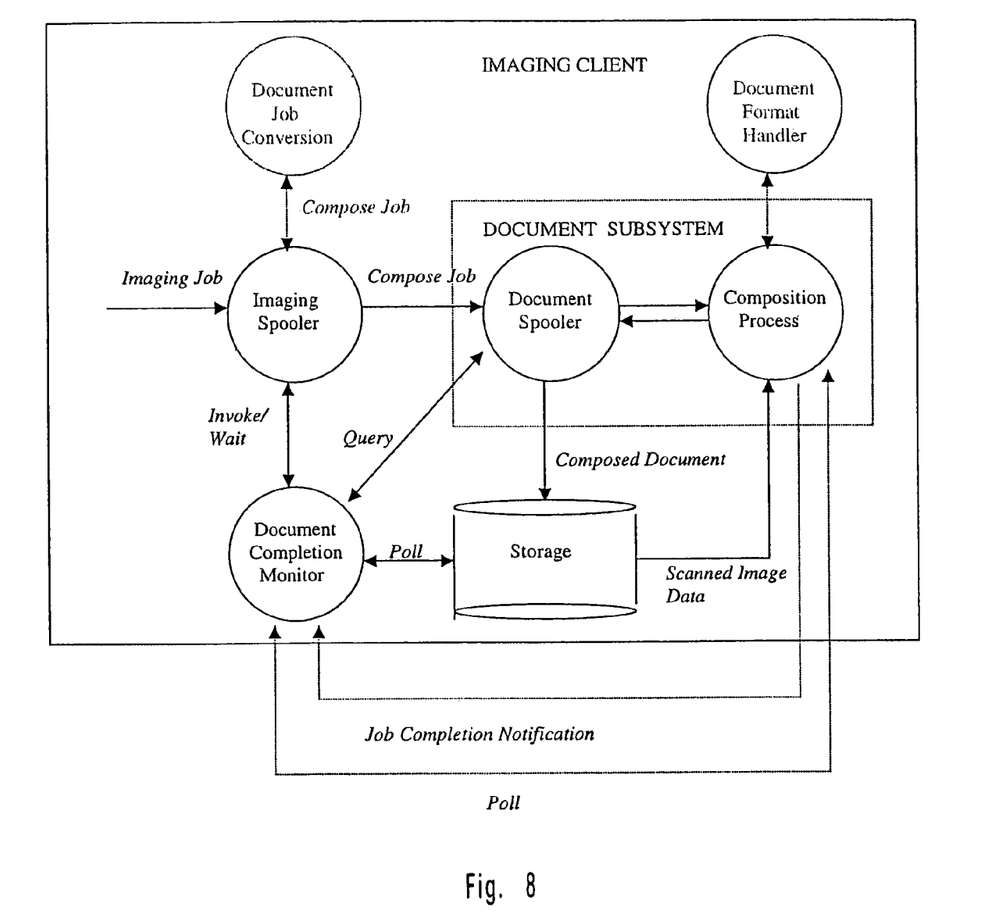

The imaging spooler may also control how and/or when the document spooler despools the document composition job by specifying scheduling and spooling settings for the document composition job with the document spooler. The document spooler, after receiving the document composition job, would despool the document composition job, either immediately or delayed, to a document composition process. The document spooler or imaging spooler may also modify the document composition job to be compatible with the composition process. This is illustrated in FIG. 8.

Once the document composition job is received by the composition process, the composition process creates a new document composed of the specified document/image sources, as illustrated in FIG. 5 at step 84. The document may be composed in any manner, such that each document/image source is converted into a common format, which is then assembled into a document of a single format. Sharp-Desk Composer® is an example of such an application that composes a document from differing formats into a common format. In this product, the format converter is the GDI subsystem and the common format is EMF. The conversion works by instructing the document format specific application to print the document/image in journal mode (i.e., EMF), where the logical printer is the SharpDesk Composer® application. Another method uses a PDF printer driver to convert the document format into PDF.

Alternatively, a compound document may be created that contains each document component in the document/image's native format. The compound document generally contains indexing information that identifies the location/length of each component and the native format.

Alternatively, a reference document may be created that identifies the location, format and other related information of each component. If the composed document is to be static (i.e., the contents are fixed according to the contents at the time of creation), several methods may be used, such as: (i) having a new copy of each component created and the reference links are made to the copy; or (ii) having a soft link made to each component with a copy on write file system attribute. When the file is not updated, everybody shares the same copy. If the file is subsequently updated, each soft link is replaced with a copy of the original.

Once the composed document is successfully generated, the composition process either sends an acknowledgement of job completion to the document spooler subsystem, a document job monitor, or is detected by another asynchronous process, such as those described earlier. The imaging spooler may also perform other operations related to the document composition job, such as: (i) error recovery—e.g., detecting job failure, notifying the user and/or rescheduling the document composition job with the same composition process, or restarting with another composition process.

Alternatively, the composition process may send job completion notification by means other than through the document spooler subsystem (e.g., to a separate document job monitoring process on the imaging client), or the imaging spooler may detect document job completion by querying/polling the composition process. This is illustrated in FIG. 8.

With reference back to FIG. 5, after detecting completion of the document composition job (decision block 86), the imaging spooler dispatches the print job at step 88 and waits for its completion, according to the master job description. The imaging spooler locates the print job portion of the imaging job, using the job name identifier in the master job (e.g., @IJL DO JOB "print job 1") and the job identifier in each individual imaging job (e.g., @IJL SET JOB="print job 1").

The imaging spooler dispatches the print job portion (@PJL) of the imaging job to the print spooler subsystem for despooling to the logical printing device specified in the @IJL SET DEVICE command. The imaging spooler also monitors the completion of the print job. For example, the imaging spooler may invoke a print job monitoring process that either (i) waits for a message or queries the print spooler subsystem for confirmation of completion of the print job, or (ii) polls the printing device to detect successful output of the print job.

Figure 9:
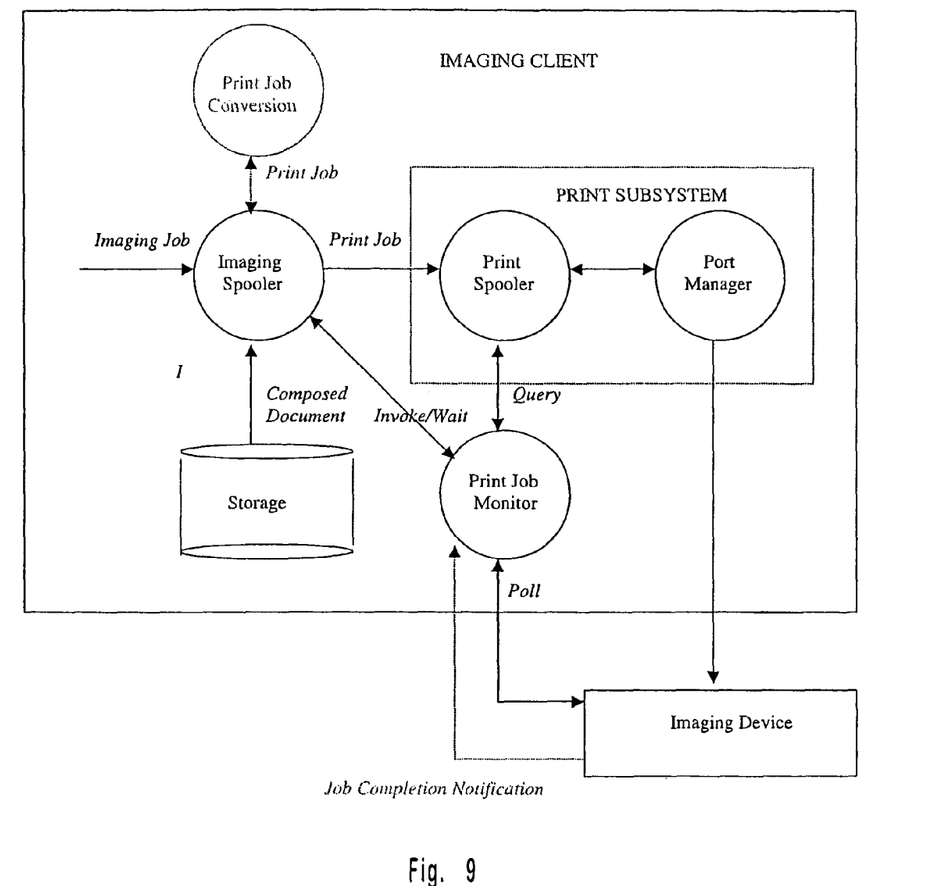

The imaging spooler may also control how and/or when the print spooler despools the print job by specifying scheduling and spooling settings for the print job with the print spooler. The print spooler, after receiving the print job, despools the print job, either immediately or delayed, to the port manager associated with the logical printer. The print spooler or imaging spooler may also modify the print job to be compatible with the printing device. This is illustrated in FIG. 9.

For example, the reference to the location of the composed document (i.e., pull printing) may be replaced with the document/image data (i.e., push printing), or the composed document may first be processed by a compatible printer driver and converted into printer ready data (e.g., PDL).

Once the print job is received by the printing device, the printing device either (i) (interactive) waits for user input at the device to start the RIP and/or outputting of the document (e.g., hold queue, such as in confidential printing), (ii) (automatic) initiates printing of the document, or (iii) (spooled) holds the print job in an internal queue and starts printing according to an internal scheduling process.

Once the print job is successfully outputted, the printing device either sends an acknowledgement of job completion to the print spooler subsystem, a print job monitor, or is detected by another asynchronous process, such as those described earlier.

The imaging spooler may also perform other operations related to the print job, such as, but not limited to, (i) printer pooling—e.g., selecting an alternative compatible printer based on some criteria, such as most available, (ii) error recovery—e.g., detecting job failure, notifying the user and/or rescheduling the print job on the same device, or restarting on another compatible device, and/or (iii) job accounting—e.g., authorizing the use of the device and recording the amount of consumables used (e.g., paper and toner).

As illustrated in FIG. 9, the scanning device may send a job completion notification by means other than through the print spooler subsystem (e.g., to a separate print job monitoring process on the imaging client), or the imaging spooler may detect print job completion by querying/polling the printing device. Confirmation of the completion of the print job is determined at decision block 90 of FIG. 5.

While embodiments of the present invention embrace spooling and despooling subsystems of the Microsoft Windows® operating system, other embodiments of the present invention include the spooling and despooling subsystems of the Apple MacIntosh® operating system, Linux® operating system, System V Unix® operating systems, BSD Unix® operating systems, OSF Unix® operating systems, Sun Solaris® operating systems, HP/IUX operating systems, and IBM® Mainframe MVS operating system, IBM® AS/400 Citrix, Novell® Netware, and other operating systems.

Thus, as discussed herein, the embodiments of the present invention embrace providing imaging job control. In particular, the present invention relates to systems and methods for describing imaging tasks (e.g., print jobs, fax jobs, scan jobs and document management) across a distributed environment of imaging clients, servers and devices, wherein the tasks include complex imaging operations. The present invention further relates to interchanging imaging data and operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for providing imaging job control, the method comprising:
constructing a composite imaging job that includes imaging tasks corresponding to a plurality of diverse imaging types; and
using an imaging spooler subsystem to selectively dispatch at least a portion of the composite imaging job to diverse imaging devices for processing the composite imaging job, wherein processing the composite imaging job comprising:
executing a first subset of steps of the composite imaging job at a first imaging device, wherein the first imaging device is one of the diverse imaging devices;
deleting the executed first subset of steps from the composite imaging job; and
executing a second subset of steps of the composite imaging job at a second imaging device, wherein the second imaging device is one of the diverse imaging devices.

2. A method as recited in claim 1, wherein the composite imaging job is constructed in a single program unit.

3. A method as recited in claim 1, wherein the diverse imaging types comprise at least one of:
(i) printing;
(ii) faxing;
(iii) scanning;
(iv) providing document management
(v) copying.

4. A method as recited in claim 1, further comprising exchanging imaging data and operations across at least some of the diverse imaging devices.

5. A method as recited in claim 4, wherein the imaging operations are programmable.

6. A method as recited in claim 1, wherein the constructing a composite imaging job includes utilizing a single imaging job language across all types of imaging devices.

7. A method as recited in claim 1, wherein the using an imaging spooler subsystem comprises:
communicating with the diverse imaging devices through a common interface; and
translating operations corresponding to the composite imaging job into communication methods that are compatible with the diverse imaging devices.

8. A method for providing imaging job control, the method comprising:
constructing a composite imaging job that includes imaging tasks corresponding to a plurality of diverse imaging types; and
using an imaging spooler subsystem to selectively dispatch at least a portion of the composite imaging job to an imaging device for processing the composite imaging job, wherein the imaging device is capable of utilizing the diverse imaging types to render the composite imaging job and wherein processing the composite imaging job comprises:
executing a first subset of steps of the composite imaging job at a first imaging device, wherein the first imaging device is one of the diverse imaging devices;
deleting the executed first subset of steps from the composite imaging job; and
executing a second subset of steps of the composite imaging job at a second imaging device, wherein the second imaging device is one of the diverse imaging devices.

9. An imaging system comprising:
a plurality of diverse imaging devices;
a computer device having spooler subsystems corresponding to the diverse imaging devices and an imaging spooler subsystem, wherein the imaging spooler subsystem is configured to selectively dispatch at least a portion of a composite imaging job to the spooler subsystem for processing the composite imaging job, wherein the composite imaging job includes imaging tasks corresponding to a plurality of diverse imaging types and wherein processing the composite imaging job comprises:
executing a first subset of steps of the composite imaging job at a first imaging device, wherein the first imaging device is one of the diverse imaging devices;
deleting the executed first subset of steps from the composite imaging job; and executing a second subset of steps of the composite imaging job at a second imaging device, wherein the second imaging device is one of the diverse imaging devices; and a communication mechanism coupled to the computer device and the plurality of diverse imaging devices.

10. A system as recited in claim 9, further comprising an imaging server coupled to the communication mechanism, and wherein the computer device is an imaging client.

11. A system as recited in claim 9, wherein the plurality of diverse imaging devices include a plurality of multi-functional peripheral devices.

12. A system as recited in claim 9, wherein the imaging spooler subsystem is configured to utilize a single imaging job language across all types of imaging devices.

13. A system as recited in claim 9, further comprising a single program unit, wherein the single program unit is configured to construct the composite imaging job.

14. A system as recited in claim 9, wherein the imaging spooler subsystem is configured to communicate with the plurality of diverse imaging devices through a common interface and to translate operations corresponding to the composite imaging job into communication methods that are compatible with the plurality of diverse imaging devices.

15. A computer readable medium storing computer program code means utilized to implement a method for providing imaging job control, wherein the computer program code means is comprised of executable code for implementing:

dynamically constructing a composite imaging job that includes imaging tasks corresponding to a plurality of diverse imaging types; and using an imaging spooler subsystem to selectively dispatch at least a portion of the composite imaging job to one of (i) diverse imaging devices and (ii) diverse imaging subsystems in a device for processing the composite imaging job, wherein processing the composite imaging job comprises:

executing a first subset of steps of the composite imaging job at a first imaging device, wherein the first imaging device is one of the diverse imaging devices;

deleting the executed first subset of steps from the composite imaging job; and executing a second subset of steps of the composite imaging job at a second imaging device, wherein the second imaging device is one of the diverse imaging devices.

16. A computer readable medium as recited in claim 15, further comprising computer program code means comprised of executable code for constructing the composite imaging job in a single program unit.

17. A computer readable medium as recited in claim 15, further comprising computer program code means comprised of executable code for exchanging imaging data and operations across at least some of the one of (i) diverse imaging devices and (ii) diverse imaging subsystems in a device, wherein the imaging operations are programmable.

18. A computer readable medium as recited in claim 15, further comprising computer program code means comprised of executable code for utilizing a single imaging job language across all types of imaging devices to implement the method.

19. A computer readable medium as recited in claim 15, further comprising computer program code means comprised of executable code for communicating with the diverse imaging devices through a common interface and translating operations corresponding to the composite imaging job into communication methods that are compatible with the diverse imaging devices.

* * * * *